Dec. 31, 1968  E. DENZLER  3,419,699

WELDING MACHINE FOR METAL GRIDS

Filed June 24, 1965  Sheet 1 of 2

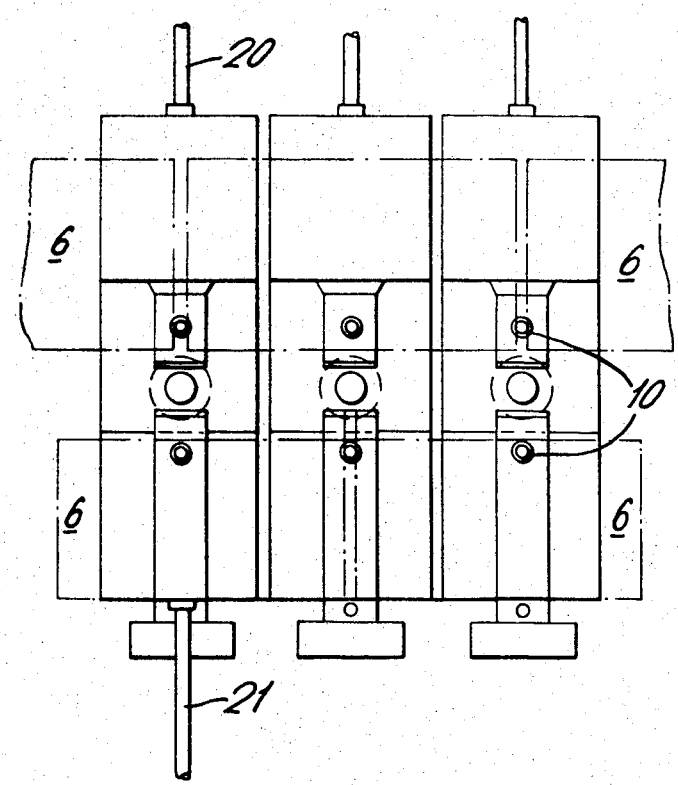

3,419,699
WELDING MACHINE FOR METAL GRIDS
Emil Denzler, Schlieren, Switzerland, assignor to H. A. Schlatter A.G., Schlieren, Switzerland
Filed June 24, 1965, Ser. No. 466,728
Claims priority, application Switzerland, June 29, 1964, 8,592/64
7 Claims. (Cl. 219—56)

ABSTRACT OF THE DISCLOSURE

A welding machine for welding wires into a grid which includes alternately arranged upper and lower welding units each supported for independent adjustable transverse movement on a frame, each of the units including a transformer, a welding press having electrodes on the front of the transformer, and a wire guide above and below the transformers of the lower and upper welding units respectively with all of the wire guides and presses arranged in substantial horizontal alignment.

---

This invention relates to welding machines for welding metal grids and wires and is concerned more particularly with the arrangement of the welding jaws which are mounted in the machine so as to be movable by means of universal bearings on a grooved track in an infinitely variable manner depending on the welding intervals selected for the longitudinal wires, rods or bars.

The units consist essentially of a welding transformer, a longitudinal wire guide and a pair of electrodes, the latter being actuated by a pressure operated device producing the advancing and return stroke of the electrodes relative to the workpiece and providing also the required welding pressure. One electrode is arranged stationary while the other electrode is movable relative to the stationary electrode.

Two types of welding jaw units may be employed for this type of operation. In one type of welding jaw unit the transformers are mounted above the longitudinal wire guides. These welding jaw units have their transformers located in a row at the upper part of the machine. In the other type of welding jaws the transformers are arranged below the longitudinal wire guide. These welding jaws have the transformers located in the machine on a lower row. The two types of welding jaws are arranged alternately in the machine. For all welding press units the longitudinal wire guides and the welding presses are located at the same level.

The width of the welding jaw units is governed basically by the mass of the transformers which are at least twice as wide as those of the welding presses. For this reason the welding presses of the upper and lower units are disposed alternately adjacent each other in a row. It follows from this that for the choice of the smallest possible longitudinal wire interval the transformers of both rows are moved closely together and line up relative to each other with a displacement of half a transformer width. For large longitudinal wire intervals the welding jaw units may be moved apart depending on the distances. The excess welding jaw units which are not being employed may be disconnected and moved to both sides of the active jaw units. It results from this that the contact area for the welding jaw units extends further across the width of the machine than the maximum possible grid width to be welded. The welding jaw units may also be completely removed from the machine.

The welding presses of each unit have each an electrode which is fixedly secured to the unit and an electrode which is actuated by the pressure exerting device.

The electrodes are connected to the secondary winding of the transformer of the welding jaw unit. The welding jaw units are supported at one side in a universal bearing which may be slidably moved in a grooved track across the width of the machine, and on the other hand each welding jaw unit may be moved in the vertical direction either up or down by means of a second supporting element, for example in the form of a setting screw. Accordingly the welding jaw units and their longitudinal wire guides may be directed to the desired level or height.

In their rest position the electrodes are pulled away from the wires to be welded and are therefore not worn away by the advancing movement of the wires. In the case of wires which are slightly deformed in the vertical direction the electrodes may be pressed against the workpiece in adapting itself to the deformation of the wire due to the pressure exerting device and the universal bearing arrangement.

The closed circuit at each individual welding point has the advantage with respect to two point presses that no shunts can arise through already welded cross-wires. By eliminating the shunt currents which can absorb up to 50% of the total current, by using transformers with liquid cooled secondary windings and employing during the assembly of the transformer and the welding press long connections so that inductive losses may be largely eliminated, has the result that the transformers may be generally made very small also for welding relatively thick wires of about 16 mm. diameter. The small size of the transformers and the offset arrangement of the upper and lower welding jaw units make possible a close relationship of the longitudinal wires. The easy mobility of the units facilitate, as a further advantage, the rapid changeover of the machine for grid welding from one longitudinal wire spacing to another.

Furthermore the pressure for actuating the pressure exerting device of each welding jaw unit may be employed in a subsequent circuit flow for cooling its transformer secondary winding and its electrodes.

The novel features and advantages of the invention will become apparent from the following description taken in connection with the attached drawing which illustrates an example of a grid welding machine according to the invention. In the drawing:

FIGURE 3 shows the front view of a set of three welding jaw units mounted for the narrowest longitudinal wire distance.

Figure 1:
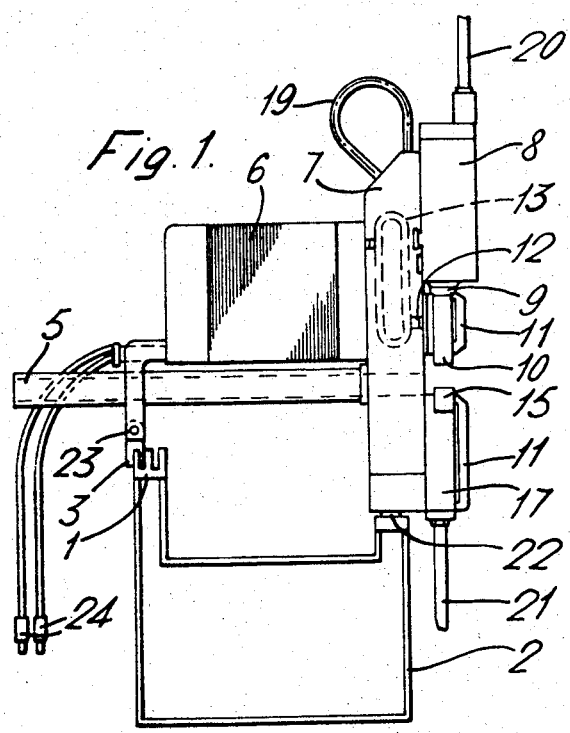
FIGURE 1 shows a side view of an upper welding jaw unit according to the invention mounted on a cross support of a grid welding machine.
Figure 2:
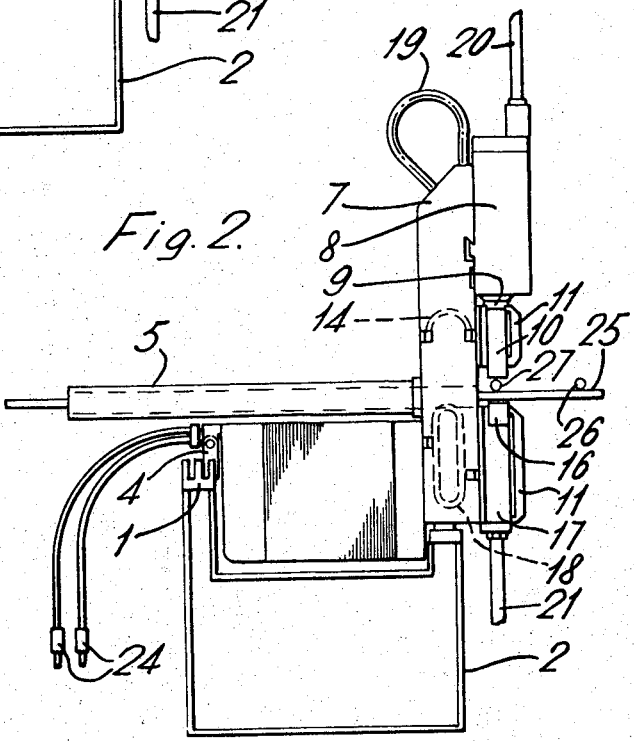
FIGURE 2 shows a side view of the lower welding jaw unit mounted on a cross support of the grid welding machine of FIGURE 1.

Referring now more particularly to FIGURES 1 and 2 of the drawing, numeral 1 indicates a grooved track which is mounted lengthwise of the machine housing 2. On the grooved track are clamped alternately in succession the joint bearings 3 of the upper welding jaw units and the joint bearings 4 of the lower welding jaw units by suitable means not shown. The longitudinal wire guide 5 is fixedly connected to the transformer 6 and the press plate 7. The press 8 which represents in this case the pressure exerting device is connected by a conventional quick clamping device not described here in detail to the pressure plate 7. The press itself can be constructed basically according to the press described in U.S. Patent 2,998,506 entitled "Spot Welding Machine." The upper electrode 10 is fixed to the press ram 9. By means of bridging elements 11, the upper electrodes 10 of the upper welding jaw unit are connected to the intermediate members 12 and to the current strap 13 conducting the secondary voltage. For the lower welding jaw unit the same elements 11, 10 and 12 are connected with the current strap 14 conducting to mass. The lower electrode 15 of the upper welding jaw unit is connected with its base support 17 securely to mass. The lower electrode 16 of the lower welding jaw unit is secured with its base support 17 in an insulated manner on the press support 7. The current strap 18 provides the electrical connection between the secondary current clamp of the transformer and of the electrode 16.

The tube 20 conducts the necessary amount of pressure medium required for actuating the press 8. The tube 19 conducts the same medium as coolant medium to the transformer secondary winding and thereafter cools the electrode base support. The discharge takes place through tube 21. This tube is shown for reasons of clarity in FIGURE 3 only on one press.

The welding jaw unit may be vertically adjusted by means of the setting screw 22 whereby the welding jaw unit may be rotated around the joint pin 23. The primary connection of the transformers 6 may be obtained by means of plugs 24 in a socket panel which extends across the entire length of the machine. In this manner the welding jaw units distributed at each point may be connected to the three phases of the feeding voltage.

In FIGURE 2 the cross-wire 26 has already been welded to the longitudinal wire 25 and the cross wire 27 is located below the upper electrodes on the longitudinal wires ready for the welding operation.

The operation of the machine will now be described. The welding jaw units are spaced according to the desired intervals of the longitudinal wires and the joint bearings 3 are clamped in the grooved track 1 and adjusted by means of the setting screws 22 to the desired level. The longitudinal wires 25 are introduced into the longitudinal wire guides 5 and are moved ahead until they are located between the electrodes. The remaining procedure is automatically controlled by a suitable automatic machine control not illustrated. By conventional means a cross-wire is introduced over the longitudinal wires under the electrodes 10. The pressure exerting device of the presses 8 urges the upper electrodes down on the cross-wire. The welding jaw units rotate around the pivot pin 23 until the lower electrodes 15 and 16 provide the necessary counter pressure. After the preselected welding program is terminated the electrodes move away from the workpiece and the welding jaw units move back into their rest position.

Gripper elements not shown grasp in a conventional manner the welded cross-wire and pull it ahead together with the longitudinal wires by the desired cross-wire spacing whereupon the cycle is repeated until the length of the grid is welded to completion.

What is claimed is:

1. A welding machine for metal grids of the type having transversely spaced, longitudinal wires and longitudinally spaced, transverse wires welded thereto comprising, in combination, a frame, transversely extending track means on said frame, a plurality of upper and lower welding units, means for supporting said upper and lower welding units on said track means for movement transversely of said frame, each of said welding units including a transformer, means for connecting said transformer to an associated source of power, a wire guide for one of said longitudinal wires and a welding press supported on the front of and centrally intermediate the sides of said transformer and having a pair of vertically spaced welding electrodes arranged for relative vertical movement for a welding operation, means for electrically connecting said electrodes to said transformer, said wire guide on each of said upper welding units being positioned below said transformer for guiding a longitudinal wire between said electrodes, said wire guide on each of said lower welding units being positioned above said transformer for guiding a longitudinal wire between said electrodes, said wire guide on each of said lower welding units being positioned above said transformer for guiding a longitudinal wire between said electrodes, said upper and lower welding units being arranged alternately in rows with all of said wire guides and all of said welding presses in substantial horizontal alignment.

2. A welding machine in accordance with claim 1 wherein said means for supporting said upper and lower welding units include a pivot for pivotally supporting the rear of each of said units on said track means and a vertically adjustable element for supporting the front of each of said welding units to permit pivotal movement of each of said units on said pivot to adjust the vertical position of each of said welding presses and associated wire guides.

3. A welding machine in accordance with claim 1 wherein said pair of electrodes on each of said welding presses include a lower electrode fixedly secured to said unit and a vertically movable upper electrode and including means for moving said upper electrode to and from said lower electrode for welding said grid.

4. A welding machine in accordance with claim 3 wherein said means for moving said upper electrode includes pressurized fluid actuated means.

5. A welding machine in accordance with claim 4 including means for cooling the secondary winding of each of said transformers with the pressurized fluid medium of said associated pressurized fluid actuated means.

6. A welding machine in accordance with claim 5 including means for cooling said electrodes with said pressurized fluid medium.

7. A welding machine in accordance with claim 1 wherein the width of each of said transformers is at least twice the width of the welding press supported thereon to thereby limit the minimum spacing between said horizontally aligned adjacent pairs of electrodes.

References Cited

UNITED STATES PATENTS

| | | | |
|---|---|---|---|
| 2,242,867 | 5/1941 | Martin | 219—86 |
| 2,810,817 | 10/1957 | Brems | 219—87 |
| 2,852,060 | 9/1958 | Gunther | 153—21 |
| 2,975,264 | 3/1961 | Fetz | 219—89 |

RICHARD M. WOOD, *Primary Examiner.*

P. W. MAY, *Assistant Examiner.*

U.S. Cl. X.R.

219—86